US011493481B2

(12) United States Patent
Valenza, II (10) Patent No.: US 11,493,481 B2
(45) Date of Patent: Nov. 8, 2022

(54) METHOD OF MEASURING LIQUID PROPERTIES AT ZERO GROUP VELOCITY POINT OF A GUIDED ULTRASONIC WAVE

(71) Applicant: ExxonMobil Research and Engineering Company, Annandale, NJ (US)

(72) Inventor: John J. Valenza, II, Pennington, NJ (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 272 days.

(21) Appl. No.: 16/785,794

(22) Filed: Feb. 10, 2020

(65) Prior Publication Data

US 2020/0378926 A1   Dec. 3, 2020

Related U.S. Application Data

(60) Provisional application No. 62/855,381, filed on May 31, 2019.

(51) Int. Cl.
*G01N 29/036* (2006.01)
*G01N 29/22* (2006.01)
*G01N 29/24* (2006.01)
*G01N 29/44* (2006.01)
*G01N 29/28* (2006.01)

(52) U.S. Cl.
CPC ......... *G01N 29/036* (2013.01); *G01N 29/222* (2013.01); *G01N 29/2437* (2013.01); *G01N 29/28* (2013.01); *G01N 29/4472* (2013.01); *G01N 2291/0222* (2013.01); *G01N 2291/102* (2013.01)

(58) Field of Classification Search
CPC ................. G01N 2291/0222; G01N 2291/102
See application file for complete search history.

(56) References Cited

U.S. PATENT DOCUMENTS

| | | | | |
|---|---|---|---|---|
| 5,473,934 A | * | 12/1995 | Cobb | G01N 29/024 73/61.49 |
| 6,644,119 B1 | * | 11/2003 | Sinha | G01N 29/30 73/861.31 |
| 7,798,000 B1 | * | 9/2010 | Murray | G01N 29/2418 73/579 |
| 2012/0055239 A1 | * | 3/2012 | Sinha | G01F 25/10 73/61.79 |

OTHER PUBLICATIONS

Balogun, O., Murray, T. W. & Prada, C., Simulation and measurement of the optical excitation of the S1 zero group velocity Lamb wave resonance in plates, Journal of Applied Physics, 2007, vol. 102, No. 6, p. 064914 (Abstract Only).

(Continued)

*Primary Examiner* — Tarun Sinha (74) *Attorney, Agent, or Firm* — Vorys, Sater, Seymour and Pease LLP (57) ABSTRACT

Embodiments herein generally relate to systems and methods to determine the composition, properties, and morphology of a liquid in a liquid handling structure. Aspects disclosed include exploiting spatiotemporal constraints of zero-group-velocity modes for non-contact, non-invasive, liquid sensing applications.

17 Claims, 9 Drawing Sheets

(56) References Cited

OTHER PUBLICATIONS

Cès, M., Clorennec, D., Royer, D. & Prada, C., Thin layer thickness measurements by zero group velocity Lamb mode resonances, Review of Scientific Instruments, 2011, vol. 82, No. 11, p. 114902 (Abstract Only).
Clorennec, D., Prada, C., Royer, D. & Murray, T. W., Laser impulse generation and interferometer detection of zero group velocity Lamb mode resonance, Applied Physics Letters, 2006, vol. 89, No. 2 p. 024101 (Abstract Only).
Clorennec, D., Prada, C. & Royer, D., Local and noncontact measurements of bulk acoustic wave velocities in thin isotropic plates and shells using zero group velocity Lamb modes, Journal of Applied Physics, 2007, vol. 101, No. 3, pp. 034908-1-034908-6 (Abstract Only).
Fei, D. & Chimenti, D. E., Single-scan elastic property estimation in plates, Acoustics Research Letters Online, 2001, vol. 2, No. 1, pp. 49-54 (Abstract Only).
Fergusson, F. A. A., Guptill, E. W. & MacDonald, A. D. Velocity of Sound in Glycerol. The Journal of the Acoustical Society of America 26, 67-69 (Abstract Only).
Holland, S. D. & Chimenti, D. E., Air-coupled acoustic imaging with zero-group-velocity Lamb modes, Applied Physics Letters, 2003, vol. 83, No. 13, pp. 2704-2706.
Holland, S. D., Song, J. H., Evan, V. L. & Chimenti, D. E., Applications of the Zero-Group-Velocity Lamb Mode for Air-Coupled Ultrasonic Imaging, AIP Conference Proceedings 760, 2005, pp. 970-977 Meitzler, A. H., Backward-Wave Transmission of Stress Pulses in Elastic Cylinders and Plates, The Journal of the Acoustical Society of America, 1965, vol. 38, pp. 835-842.
Meitzler, A. H., Backward-Wave Transmission of Stress Pulses in Elastic Cylinders and Plates, The Journal of the Acoustical Society of America, 1965, vol. 38, pp. 835-842 Mezil, S., Laurent, J., Royer, D. & Prada, C, Non contact probing of interfacial stiffnesses between two plates by zero-group velocity Lamb modes, Applied Physics Letters, 2014, vol. 105, No. 2, p. 021605 (Abstract Only).
Mezil, S., Laurent, J., Royer, D. & Prada, C, Non contact probing of interfacial stiffnesses between two plates by zero-group velocity Lamb modes, Applied Physics Letters, 2014, vol. 105, No. 2, p. 021605 (Abstract Only).
Nishimiya, K., Yamamoto, K., Mizutani, K. & Walatsilo. M., Negative Group Velocities of Lamb-Type Waves in a Glass/Water/Glass Structure Controlled by the Thickness of Water Layer, Japanese Journal of Applied Physics, vol. 46, No. 7B, 2007, pp. 4483-4485.
Nishimiya, K., Mizutani, K., Walatsilo. M. & Yamamoto, K. Relationships between Existence of Negative Group Velocity and Physical Parameters of Materials for Lamb-Type Waves in Solid/Liquid/Solid Structure. Japanese Journal of Applied Physics, 2008, vol. 47, No. 5, pp. 3855-3959.
Prada, C., Balogun, O. & Murray, T. W. Laser-based ultrasonic generation and detection of zero-group velocity Lamb waves in thin plates. Applied Physics Letters, vol. 87, No. 19, p. 194109 (Abstract Only).
Safaeinili, A., Lobkis, O. I. & Chimenti, D. E. Air-coupled ultrasonic estimation of viscoelastic stiffnesses in plates. IEEE Transactions on Ultrasonics, Ferroelectrics, and Frequency Control, vol. 43, No. 6, pp. 1171-1180.
Unalmis, O. H., The use of sound speed in downhole flow monitoring applications, Journal of the Acoustical Society of America, 2015, vol. 137, No. 4, p. 2224, (Abstract Only).
Wolf, J., Ngoc, T. D. K., Kille, R. & Mayer, W. G. Investigation of Lamb waves having a negative group velocity. The Journal of the Acoustical Society of America, 1988, vol. 83, No. 1, pp. 122-126.

\* cited by examiner

METHOD OF MEASURING LIQUID PROPERTIES AT ZERO GROUP VELOCITY POINT OF A GUIDED ULTRASONIC WAVE

CROSS-REFERENCE TO RELATED APPLICATIONS

This application claims the benefit of U.S. Provisional Application No. 62/855,381, filed on May 31, 2019, the disclosure of which is incorporated herein by reference in its entirety.

FIELD OF THE INVENTION

Aspects described herein relate generally to real time liquid characterization measurements, and more specifically to exploiting the spatiotemporal constraint of zero group velocity modes for liquid sensing.

BACKGROUND OF THE INVENTION

In a variety of industries, real-time determination of the composition of a liquid within a liquid handling structure is an important aspect of resource management, manufacturing, and processing. For example, in the oil processing industry, it can be important for an operator to understand how much water is in an oil/water composition within a pipe or tank, in order to properly adjust or process the contents. Alternatively, in a solvent based polymerization process at a chemical plant, it is often necessary to determine the molecular weight of the polymer product. Lastly, in some instances such as hydrocarbon production in the oilfield, it is necessary to know the morphology of the immiscible constituents in the produced liquid (e.g., emulsified or not).

One method to determine the composition, property, or morphology of a liquid under examination is through direct sampling, such as by physical removal of a sample from the liquid handling structure, or visual inspection via a window in that structure or transparent pipe section. However, this is not always practical or safe in manufacturing, processing, or transport operations. While in some applications direct sampling of a liquid is possible, there are many conditions where this may be impractical. For example, there can be a variety of limitations that prevent, or at least make costly, any sort of direct analysis. Among these limitations are environmental (e.g., underwater, deep ocean), scale (e.g., miles of pipes, large/multiple containers, liquid handling structure complexity), frailty of existing structures, existing structures not amenable to the addition of direct analysis components, process limitations (e.g., process constraint or contamination sensitivity, safety considerations), in addition to the cost of adding direct analysis functionality, among other factors. Moreover, direct analysis may result in wasted product, in addition to the time required to extract and analyze a sample that may preclude determining the composition, property, or morphology of a liquid in real time.

There is a need for new and improved methods for characterizing liquids within liquid handling structures.

SUMMARY OF THE INVENTION

Embodiments described herein generally relate to determining the composition of a liquid within a liquid handling structure in a manner that is non-invasive and does not require contact with the liquid handling structure. In one embodiment, a system to determine the composition of a liquid in a liquid handling structure is provided. The system includes one or more memories that include material dispersion data for a material that makes up the liquid handling structure that may be used in identifying a waveform and a frequency to generate a mode in the material. The one or more memories further include known composition sound speed data of at least one known liquid composition. The system further includes a signal generator configured to access the material dispersion data, to receive the waveform and the frequency data, and using this data to generate a waveform. The system includes a transducer configured to receive the waveform from the signal generator and convert the waveform to a coupling signal configured to generate a mode in a surface of the liquid handling structure, and transmit the coupling signal to the surface of the liquid handling structure. A receiver sensor is included to receive a response signal generated in response to transmission of the coupling signal to the surface of the liquid handling structure, and a receiver processor to convert the response signal to a frequency domain signal. The system further includes one or more processors configured to determine the sound speed of the liquid in the liquid handling structure from the frequency domain signal, and compare the sound speed of the liquid to the known composition sound speed data. The system may then indicate to a user whether the liquid in the liquid handling structure is substantially the same as at least one known liquid composition.

In yet another embodiment, a system to determine the composition of a liquid under test in a liquid handling structure is disclosed. In one embodiment, the system includes a transducer configured to couple a waveform to a location in a wall of a liquid handling structure, wherein the waveform is configured to actuate a standing wave mode in the liquid under test. The system further includes a receiver positioned to receive a response signal generated by the standing wave mode in the liquid under test, and one or more processors configured to determine the sound speed of the liquid under test from the response signal. The system includes a display configured to display the sound speed of the liquid under test. In some embodiments, the system may further comprise one or more processors configured to compare the sound speed of the liquid to at least one known liquid sound speed, and the display may be further configured to indicate whether or not the sound speed of the liquid is the same as the known liquid sound speed.

In yet another embodiment, a system to determine the composition of a liquid under test in a liquid handling structure is disclosed. In one embodiment, the system includes a transducer configured to couple a waveform to a location in a wall of a liquid handling structure, wherein the waveform is configured to actuate a standing wave mode in the liquid under test. The system further includes a receiver positioned to receive a response signal generated by the standing wave mode in the liquid under test, and one or more processors configured to determine the sound speed of the liquid under test from the response signal. The system includes a display configured to display the sound speed of the liquid under test. In some embodiments, the system may further comprise one or more processors configured to compare the sound speed of the liquid to at least one known liquid sound speed, and the display may be further configured to indicate whether or not the sound speed of the liquid is the same as the known liquid sound speed.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of the present disclosure and are therefore not to be considered limiting of its scope, for the present disclosure may admit to other equally effective aspects.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION OF THE INVENTION

The descriptions of the various aspects of the present disclosure have been presented for purposes of illustration, and are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application, or technical improvement over technologies found in the marketplace, or to enable others of ordinary skill in the art to understand the aspects disclosed herein.

Embodiments of the present disclosure include systems and methods to determine the sound speed of a liquid which can be used to identify a composition of a liquid within a liquid handling structure, in a non-invasive, non-contact manner. In addition to providing real-time data about a liquid in a pipe or container, embodiments of the present disclosure avoid the need for direct sampling.

As will be appreciated by one skilled in the art, similar techniques to embodiments described herein may be applicable in determining the viscosity of a liquid by measuring the speed of sound in the liquid. In these embodiments, the viscosity may be used to determine a molecular weight of a composition. Determination of molecular weight by techniques described herein may be useful to understand the composition, or extent (and by inference the rate) of reaction, of organic liquids in a liquid handling structure.

As a practical example, in a liquid handling structure it may be expected that a liquid within a range of known liquid compositions may be present, but that the particular composition of liquid within a pipe or container is unknown. Based upon the understood range of possible liquid compositions, density or sound speed data is gathered, for example from empirical data, industry handbooks or databases, from calculations based upon theory, or other source of data suitable for the desired application.

In addition, within a particular liquid handling structure the material makeup of the infrastructure would likely be known, such as the material makeup and thickness of pipes, containers, and other components. Based upon liquid handling structure component material makeup and thickness, wave dispersion data may be generated and/or consulted to understand the frequency content and associated waveform needed to generate, for example, an acoustic signal that couples into an elastic guided mode into a component of the liquid handling structure. An example of such dispersion data may be seen in FIG. 2, an exemplary dispersion plot for a steel plate.

Figure 2:
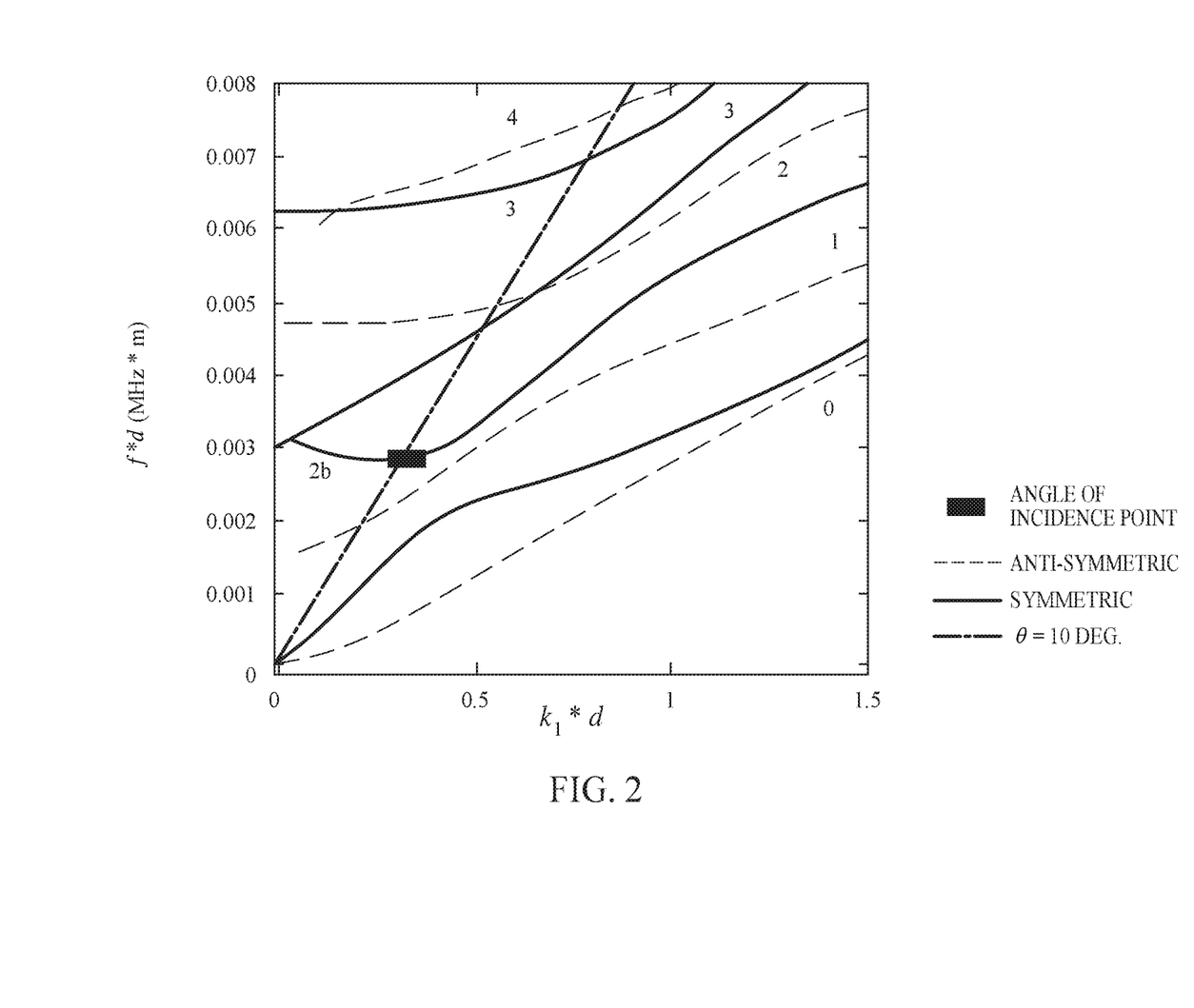
FIG. 2 depicts an exemplary material dispersion plot with exemplary material dispersion data, according to embodiments.

The dispersion plot indicates the combinations of frequency, f, and wavenumber, k, (see below) that result in elastic guided waves in thin structural components. The family of curves in FIG. 2 illustrates an example of the continuous variation of combinations of frequency and wavenumber that are termed elastic guided modes. Elastic guided modes occur when the associated wavelength is similar to the thickness of the structural component. Because of this condition as indicated in FIG. 2 the frequency and wavenumber scale linearly with the thickness of the structural component. Dispersion data may also be presented as a plot of group or phase velocity versus wavenumber. These velocities may be derived from the data shown in FIG. 2, as is known by one of ordinary skill in the art. The phase velocity may be determined by the ratio of frequency to wavenumber at each point on the indicated elastic guided modes. Similarly, the group velocity may be determined by taking the derivative at each point on the elastic guided mode.

Dispersion data for a material may be found empirically, within relevant handbooks and databases, as well as determined from theory based on known values of the longitudinal and transverse sound speed for the material that makes up the structural component.

Figure 1:
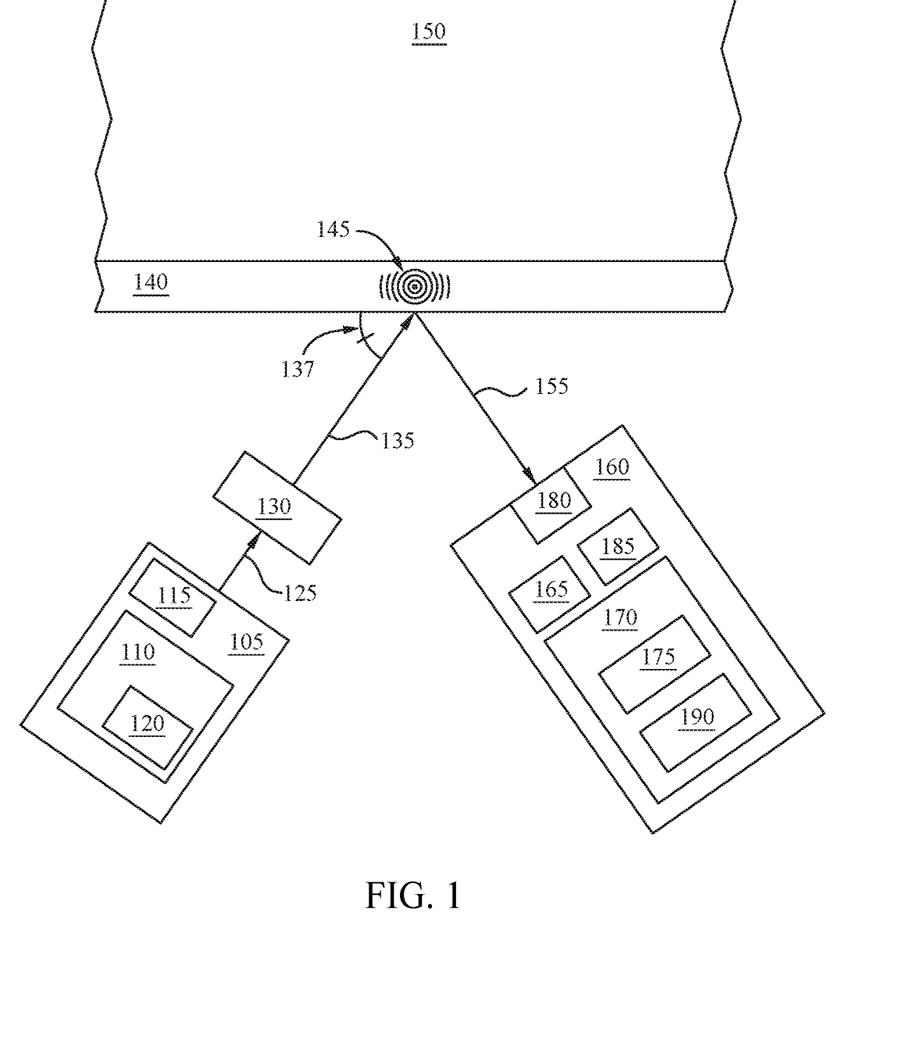
FIG. 1 depicts a system for determining the composition of a liquid in a liquid handling structure, according to embodiments disclosed herein.
Figure 4:
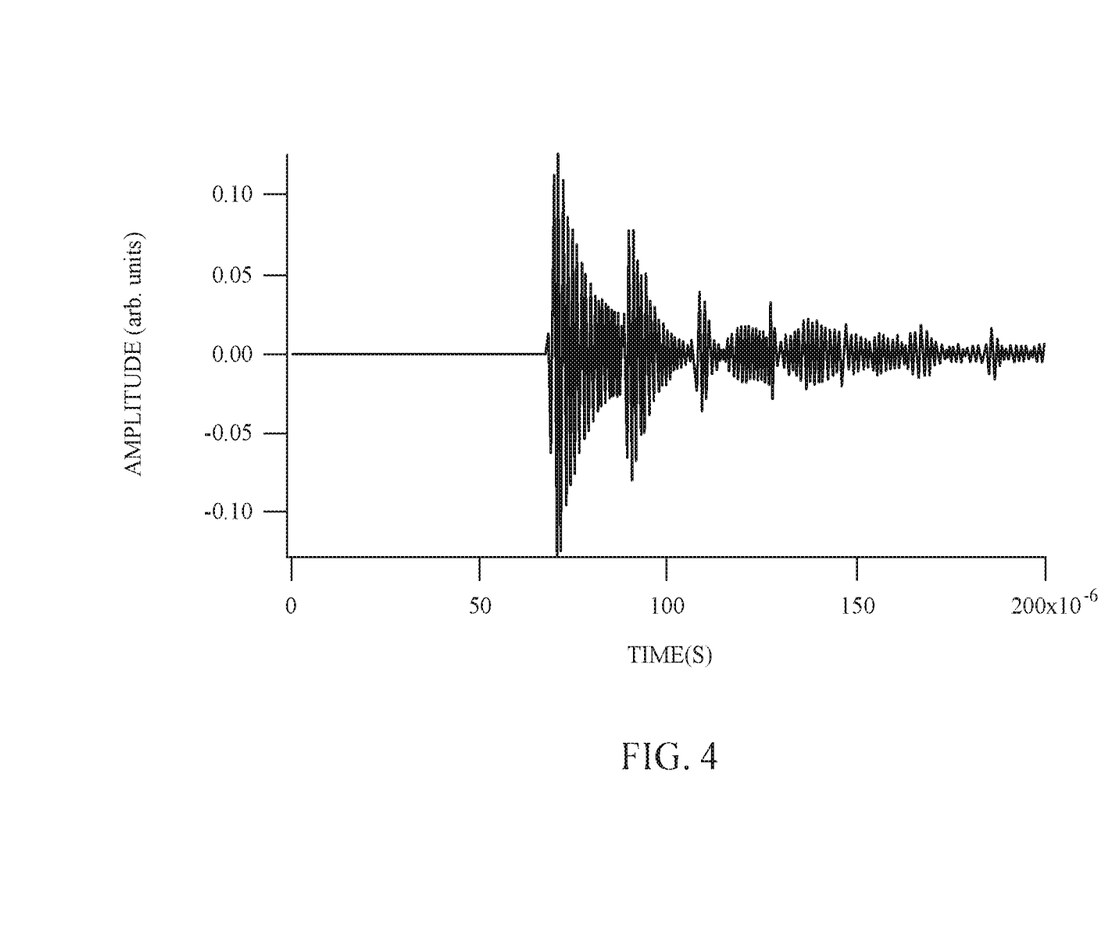
FIG. 4 depicts an exemplary response signal measured from a test liquid.
Figure 5:
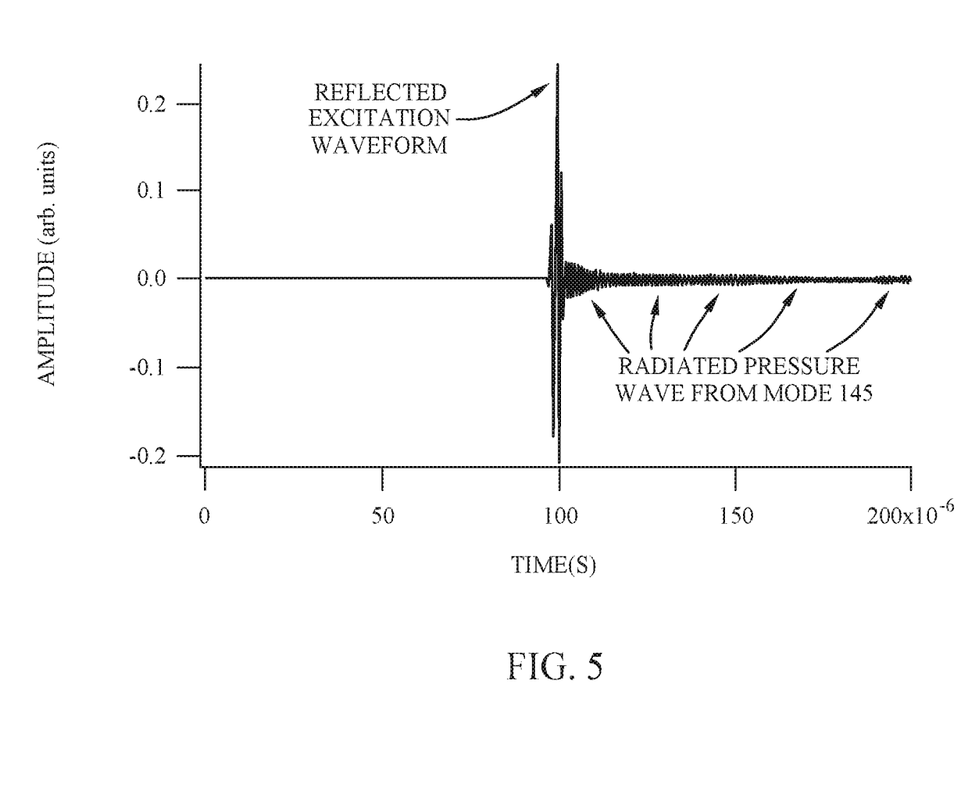
FIG. 5 depicts an exemplary response signal measured from the reflection off of a liquid handling structure.

With the dispersion data for the liquid handling structure component, a waveform 125 of FIG. 1 may be generated capable of generating a desired elastic guided mode in the structural component. This waveform may be provided to an acoustic transducer to produce the coupling signal 135 of FIG. 1. For example, in an underwater application the acoustic transducer generates a pressure wave in the surrounding water that propagates towards the liquid handling structural component and couples into a mode 145 of FIG. 1, which may be an elastic guided mode, in a component of the liquid handling structure, such as a pipe. Within the pipe wall, the desired elastic guided mode in turn couples into a standing acoustic pressure wave or mode in the liquid contained within the pipe. The standing pressure waves in the liquid within the pipe occur at specific frequencies. These frequencies, corresponding to the standing modes in the contained liquid may, be detected by monitoring a response signal 155 of FIG. 1 that in turn can be detected by a receiver sensor 180 of FIG. 1 that for this example is an acoustic sensor. In some embodiments, the acoustic sensor could be contained within the pipe, directly measuring the response of the liquid contained in the pipe. FIGS. 4 and 5 shows example response signals measured in the test liquid, and from the reflection of the coupling signal off of the structural component, respectively.

Figure 6:
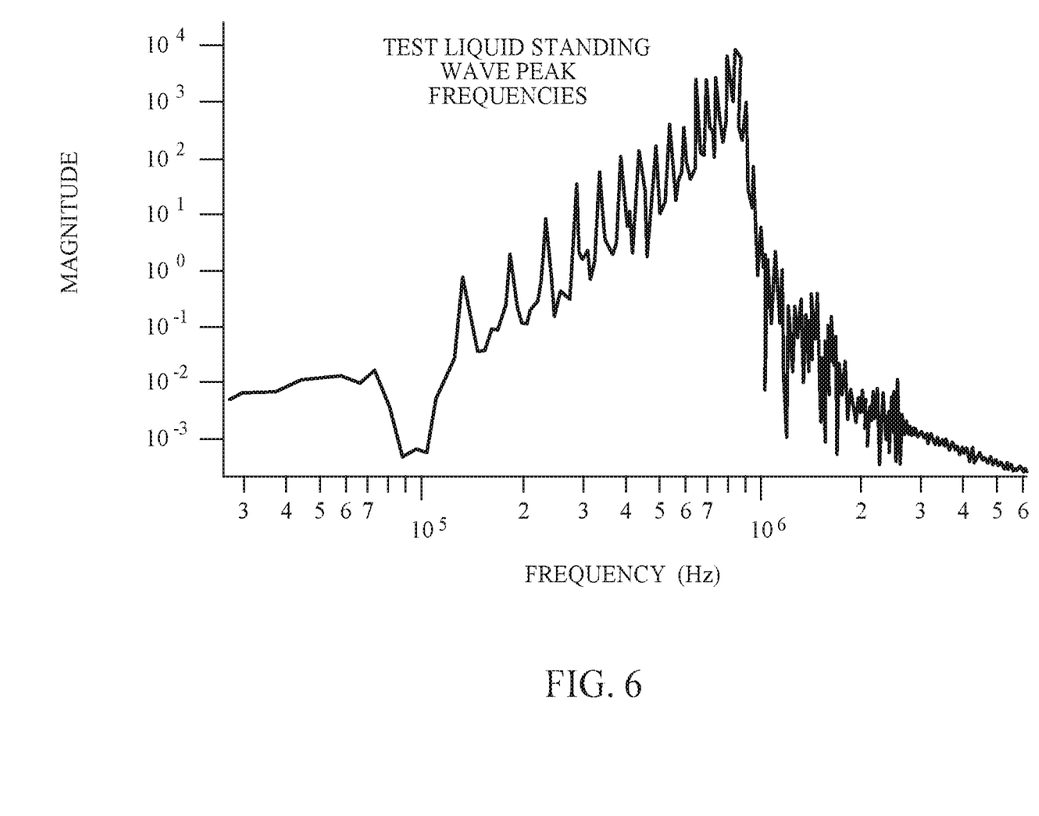
FIG. 6 depicts an exemplary Fourier transform of the response signal in FIG. 4.
Figure 7:
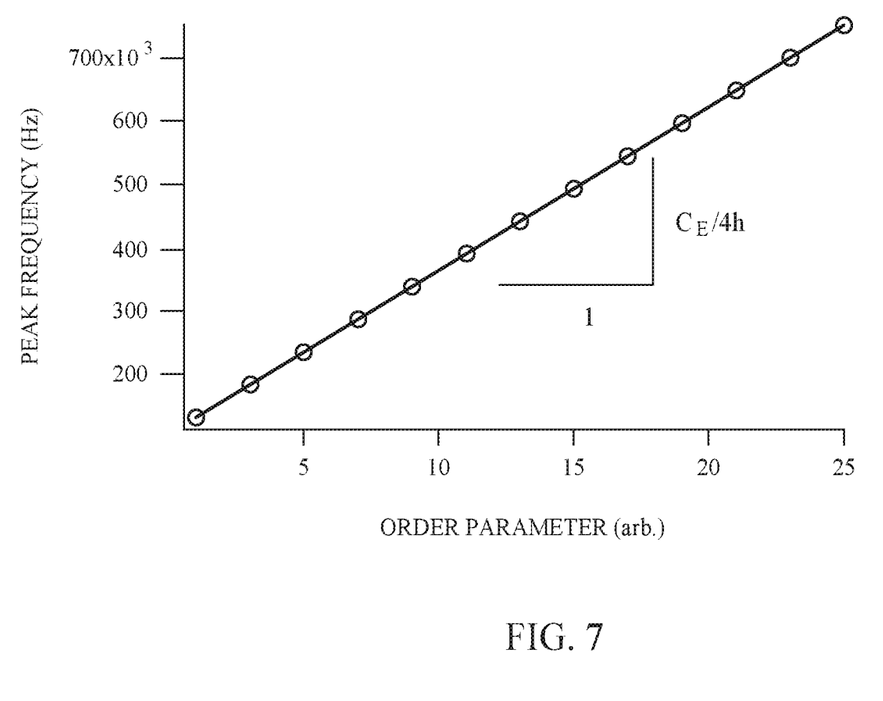
FIG. 7 depicts an exemplary position of the peaks observed in FIG. 6 versus an arbitrary order parameter, according to an embodiment.
Figure 8:
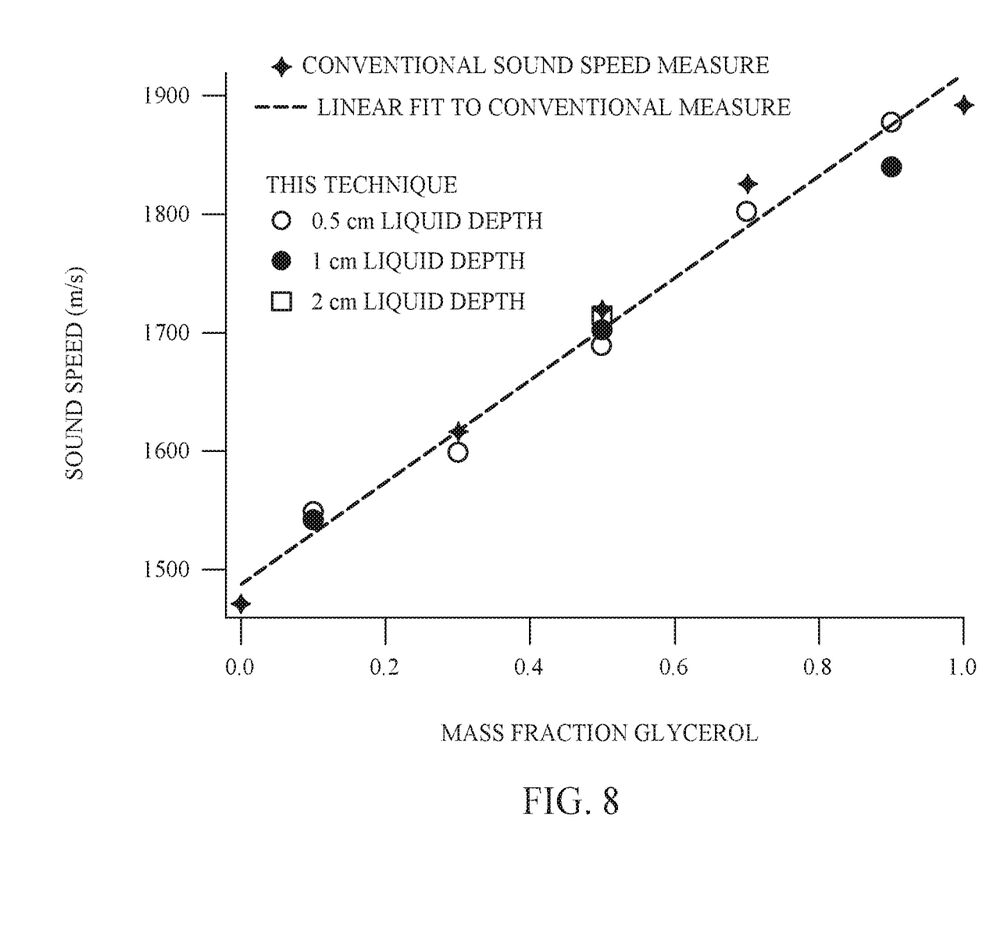
FIG. 8 shows exemplary sound speed data inferred using this technique on a miscible liquid mixture, according to an embodiment.
Figure 9:
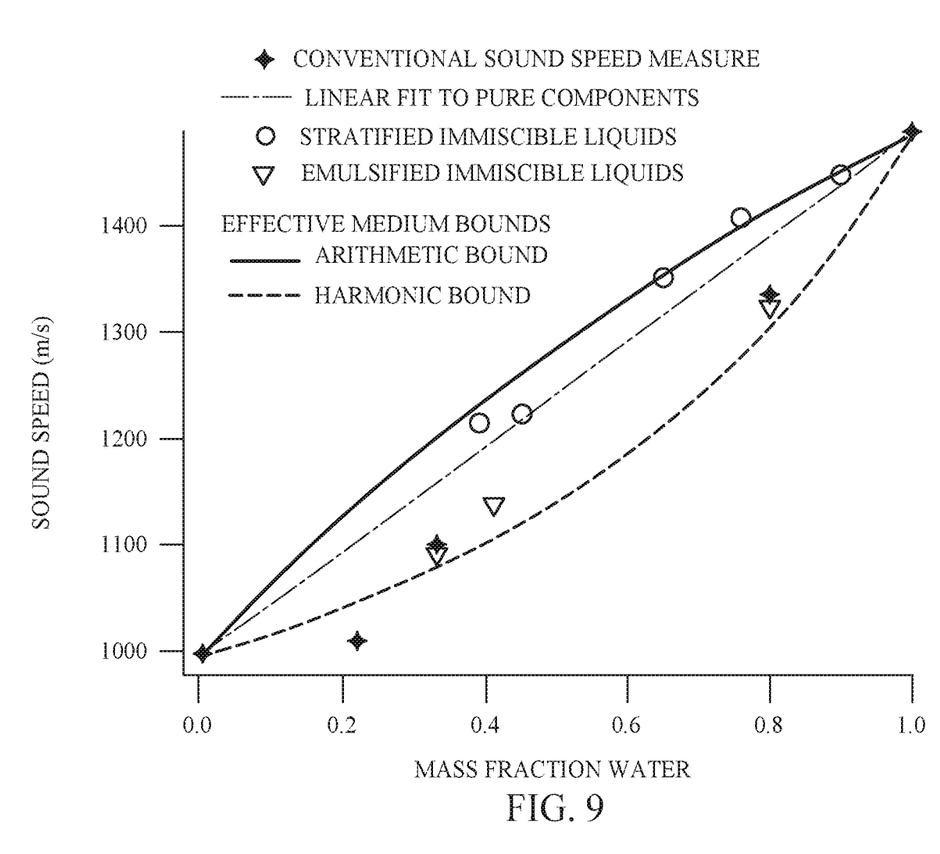
FIG. 9 shows exemplary sound speed data inferred using this technique for an immiscible liquid mixture according to an embodiment.

The time domain response signals detected by the acoustic sensor are transformed to the frequency domain, or otherwise analyzed for their frequency content. These frequencies are then used to determine the sound speed of the liquid contained in the pipe that may then be used to infer the composition, related property, or morphology of the liquid. FIG. 6 shows the frequency domain representation of an exemplary response signal measured in the test liquid, corresponding to the exemplary detected signal shown in FIG. 4. FIG. 7 shows an exemplary position of the peaks of the frequency domain representation of FIG. 6, which in this example are equally spaced. The sound speed and depth of the test liquid dictate the peak spacing. FIG. 8 shows the sound speed inferred using this technique for exemplary miscible water/glycerol mixtures on top of a stainless steel plate. FIG. 9 shows the sound speed inferred using this technique for exemplary immiscible silicon oil/water mixtures on top of a stainless steel plate.

As can be seen by the above-described embodiment, this process requires no invasive process to obtain a direct sample, nor does it require contact with the liquid handling structure. Moreover the measurement takes less than a millisecond enabling measurements to be carried out as often as is needed, and continually if desired.

FIG. 1 depicts an exemplary embodiment of a system 100 capable of carrying out embodiments of the present disclosure. A signal generator 105 is capable of generating time varying electric signals or waveforms that may be passed through an amplifier, then subsequently translated to a transducer that converts the electrical waveform to a vibrational waveform as described below. The signal generator 105 includes a signal generator memory 110 which further includes waveforms characterized by frequency content that is consistent with the associated material dispersion data 120 that characterizes material(s) that makes up portions of a liquid handling structure or components thereof. In embodiments, such a material may be any material suitable for use in a liquid handling structure, including any metal, by way of example steel, aluminum, copper, any plastic, or any engineered material, suitable to the needs of a particular application. The signal generator memory 110 may include one or more physical or virtual memories, any of which may be located remotely and accessed via a network. The signal generator further includes a signal generator processor 115. One skilled in the art will appreciate that the signal generator processor 115 may include one or more physical or virtual processors, any one of which may be located remotely and accessed via a network.

Data suitable for material dispersion data 120 can be found by one skilled in the art from a variety of sources. Known dispersion data sources for known materials (e.g. graphs, handbooks, databases), empirical determination, calculation from known theories or formulas, or any other suitable method now known or later developed to determine material dispersion data 120.

Material dispersion data 120 in the context of described embodiments include wavenumber data, group velocity data, phase velocity data, and frequency data that may generate a particular elastic guided mode in a known material. As will be appreciated by one skilled in the art, a particular mode may, in some embodiments, be determined by solving a wave equation, subject to relevant boundary conditions. In embodiments, a sample dispersion relation for elastic guided modes can be described by the following equation:

$$\frac{\tan\left(\frac{k_{2,L}d}{2}\right)}{\tan\left(\frac{k_{2,T}d}{2}\right)} = -\left(-\frac{4k_1^2 k_{2,L} k_{2,T}}{\left(k_{2,L}^2 - k_1^2\right)^2}\right)^{-1}. \quad \text{(equation 1)}$$

In Equation 1, d represents the thickness of a plate within a liquid handling structure (e.g. a wall of a pipe, container, or other component), k is a wavenumber, the subscripts T and L indicate wavenumber elements associated with transverse or longitudinal modes, respectively, and the numerical subscript indicates the associated orientation with respect to the mid-plane: 1 for parallel, 2 for perpendicular. The mid-plane is perpendicular to the edges of the plate, parallel to the faces of the plate, and located at a depth of d/2 from either face. In a liquid handling structural component, such as a pipe, the mid-plane is perpendicular to the ends of the pipe, parallel to the internal and external surface of the pipe characterized by the internal and external diameter of the pipe cross-section, and located half-way between these surfaces. The reciprocal on the right hand side of equation 1 only applies when considering anti-symmetric modes. Here mode symmetry refers to the displacement profile relative to the mid-plane. The various wave numbers in equation 1 are related, $k_{2,j} = k_j - k_1$, where j=L or T, $k_j = \omega/c_j$ is the conventional longitudinal (L) or transverse (T) wavenumber, $\omega = 2\pi f$ is the angular frequency and c is the sound speed. Since all quantities in equation 1 are given by material properties (the longitudinal and transverse sound speed, $c_L$ and $c_T$, respectively) or the dimensions of the structural component (thickness, d) the combinations of frequency and wavenumber parallel to the mid-plane that represent solutions to this equation indicate conditions for actuating elastic guided modes in the structural component.

If $c_L$, $c_T$, and d are known, in embodiments, equation 1 may be solved to determine the conditions ($k_1$,f) necessary to actuate a specific wave or mode. There are many numerical techniques to determine the roots of equation 1, and one skilled in the art will appreciate a variety of commercially available applications such as Disperse, published by Imperial College London, Non-Destructive Test Lab for the purpose. Exemplary symmetric and anti-symmetric modes for a stainless steel plate used with some embodiments are shown in FIG. 2. The values of frequency and wavenumber shown in FIG. 2 are normalized by the plate thickness indicating that these quantities, and thus the material specific dispersion data scales linearly with the wall thickness of the liquid handling structural component.

In embodiments, a lack of mode propagation, a zero group velocity (ZGV) mode, yields a spatiotemporal constraint that may be used for non-contact and non-invasive sensing of sound velocities of a liquid composition within a liquid handling structure.

Material dispersion data 120 may be manually entered by a user, provided from another memory source, or via a network.

The signal generator processor 115 accesses material dispersion data 120 from the signal generator memory 110 to generate the waveform 125. In some embodiments, the waveform 125 generated by the signal generator processor 115 is operable to generate the mode 145 in a wall 140 of a structural component made of a material composing the liquid handling structure. In some embodiments, the mode 145 is an elastic guided mode such as a zero group velocity, or ZGV, mode. Additionally, in some embodiments, the signal generator processor 115 may access the material dispersion data 120 to determine an angle of incidence 137 at which the coupling signal 135 may be delivered to the wall 140. The angle of incidence 137 may be determined based upon the point, indicated by a wavenumber, where the slope of an elastic guided mode of the material dispersion data is equal to zero. An exemplary angle of incidence point is shown in FIG. 2. Alternatively, the target wavenumber may be achieved with an arbitrary angle by manipulating the sound speed of the liquid, or in some embodiments gas, surrounding the transducer.

In embodiments, a transducer 130 receives the waveform 125 from the signal generator 105, converting the waveform 125 to the coupling signal 135 suitable to propagate towards the wall 140 and actuates the mode 145 in the wall 140.

In some embodiments the coupling signal 135 is generated in a liquid environment, such as water, an organic liquid (e.g. hydrocarbon), an inorganic liquid, or some other liquid encasing a component of a liquid handling structure. For embodiments operating within this liquid environment, the coupling signal 135 may be an acoustic signal mechanically generated in any manner suitable to a liquid environment, such as via a piezoelectric transducer. In other embodiments, the coupling signal 135 may be generated in a gaseous environment such as air. In these environments, embodiments may employ a variety of methods to generate a coupling signal, such as a pressure wave generated by a thin membrane, effecting instantaneous thermal expansion on the material surface, thermoacoustically with a pulsed laser, or by developing the eddy currents in the wall 140 with an electromagnetic acoustic transducer. It should be noted that thermoacoustic and electromagnetic transducers may be operable in full or partial vacuum environments, in some embodiments. One skilled in the art may determine other methods by which to develop the mode 145 in wall 140 appropriate to operational needs without departing from the spirit and scope of the present disclosure. In addition to the above described embodiments of transient or pulsed techniques to develop the mode 145 in the wall 140, it is contemplated that techniques capable of continuous generation of mode 145 in the wall 140 may be utilized either alone or in combination with disclosed embodiments.

Although exemplary disclosed embodiments include non-contact techniques to develop the mode 145 in a wall 140, it is contemplated herein that contact techniques may be used without departing from the scope and spirit of this disclosure.

Once the mode 145 is generated in the wall 140, the mode 145 in embodiments effectively behaves as an embedded transducer in the wall 140 that in turn couples into standing wave modes within a liquid under test 150. The frequencies at which these standing wave modes occur can be detected in an acoustic reflection response that can in turn be detected at the wall 140, in the form of the response signal 155 discussed below, and/or within the liquid under test 150. In embodiments, it is expected that these responses will exhibit attributes consistent with effective activation of these standing mode frequencies, $f_N$. Moreover, when the standing modes are actuated in the liquid under test 150, the associated spacing between overtones should be constant.

$$f_N = \frac{(2N+1)c_E}{4h}. \quad \text{equation (2)}$$

In equation 2, $c_E$ is the inferred longitudinal sound speed in the liquid under test, and N is the arbitrary overtone parameter.

In some embodiments, the acoustic reflection response will be missing the frequencies at which these standing modes (e.g. negative peaks) occur because the vibration in mode 145 at these frequencies are absorbed by the liquid under test 150. The determination of these missing frequencies may provide information as to the sound speed of the liquid under test 150, and by inference, its density (or viscosity), and concomitantly, composition, various properties, and/or morphology.

Liquid under test 150, in some embodiments, may include a homogenous liquid, liquid in liquid mixtures, one or more solids dispersed in liquid, or a combination of these. With regards to liquid in liquid mixtures, these may include miscible and immiscible systems. With regards to immiscible systems, embodiments include all morphologies of mixtures, such as, for example, emulsions and/or density separated (i.e. layered) mixtures.

In some embodiments, the acoustic response of the liquid under test 150 will be dominated by the frequencies of the standing modes (e.g. positive peaks) because the vibration in mode 145 at these frequencies efficiently couple into the standing modes at these frequencies. The determination of these dominant frequencies may provide information as to the sound speed of the liquid under test 150, and by inference, its density (or viscosity), and concomitantly, composition, one or more properties, or morphology.

As a result of the acoustic reflection response from the liquid under test, the response signal 155 is generated that may be detected at the wall 140, by the receiver sensor 180, that is coupled to a receiver 160. Receiver sensor 180 may be chosen by one skilled in the art to be appropriate for a particular application of the system described herein. In embodiments, when operating in a liquid environment (e.g. water), piezoelectric transducers, hydrophones, or acoustic microphones may be utilized. In gaseous (e.g. air) environments, thin membrane, optical interferometers (e.g. laser vibrometers), and electromagnetic acoustic transducers may be employed, with all but the thin membrane embodiments being useful in full or partial vacuum environments. In some embodiments, it is contemplated that the acoustic reflection response may be detected from within a component of the liquid handling structure by placing the receiver sensor 180 inside of wall 140, for example, in an embodiment of a piezoelectric transducer, hydrophone, or acoustic microphone within the liquid under test 150, without departing from the spirit and scope of the disclosure.

In embodiments, a receiver transducer 165 in the receiver 160 employs signal processing techniques to convert the response signal 155 received at the receiver sensor 180 to a frequency domain signal. One skilled in the art will appreciate that the receiver transducer 165 may include one or more physical or virtual processors, any of which may be located remotely and accessed via a network, or other devices known to be capable of converting the response signal to a frequency domain signal. As is well understood by one of ordinary skill in the art, there are a variety of ways to perform this conversion, such as Fourier transform, wavelet decomposition, or other time-frequency analysis techniques capable of generating a frequency domain representation of the response signal 155. The frequency domain signal is then processed by a receiver-processor 185 to find positive (or negative) signal peaks in the response spectrum using peak searching algorithms, and from the signal peaks, the frequency spacing may then be determined.

In embodiments, a receiver memory 170 contains data relating to the depth of the liquid under test 150 at the wall 140 in the region adjacent to the location where the coupling signal 135 generates the mode 145. The receiver memory 170 may include one or more physical or virtual memories, any of which may be located remotely and accessed via a network. Liquid depth data 175 may be determined by measuring the rate of flow of the liquid under test 150 if the cross section of the liquid handling structure is known in the region adjacent to the location where the mode 145 is generated. One skilled in the art will appreciate that in some embodiments, a constant flow rate could be imposed at this location to ensure a consistent depth of the liquid under test 150. In other embodiments, the wall 140 in which the mode 145 is generated may be part of a measurement vessel attached to the liquid handling structure that may be filled with a valve. Regardless of how the depth of the liquid under test 150 is determined, in some embodiments a surface of the liquid under test 150 is free, that is, it is not in contact with the liquid handling structure. In these embodiments, this boundary condition supports the occurrence of quarter wave modes in the liquid under test 150, and permits the prediction of allowable frequencies in the liquid under test 150 by equation 2. In other embodiments, there is no free surface of the liquid under test 150, for example when a pipe, container, or other component of the liquid handling structure is full. In this case the constant in the numerator of equation 2 will be different (e.g. substitute 2 for 4), but the spirit of the technique is the same. The mode 145 in the wall 140 will generate half wave modes in the liquid, and the associated peak frequency spacing is still constant.

In embodiments, the receiver-processor 185 uses the frequency spacing and depth of the liquid under test 150 to then determine the sound speed of the liquid under test 150. As sound speed of a liquid composition may vary with composition, mapping the determined sound speed to known composition sound speed data 190 may then be used to infer the composition of the liquid under test 150. As other properties vary with composition, the inferred sound speed, and by extension composition, may also permit the inference of viscosity, molecular weight, density, etc. Data related to the inferred composition of the liquid under test 150 may then be displayed to a user, used as part of process control data, or any one of a wide variety of uses in industry.

In embodiments, when an immiscible liquid mixture is under test, the location of the inferred sound speed relative to the line connecting that of the pure components can be used as an indicator of mixture morphology. For instance if the inferred sound speed lies below this line, it may be inferred that the mixture is emulsified. Alternatively, if the inferred sound speed lies above this line, it may be inferred that the mixture is density separated or stratified.

Although FIG. 1 depicts an embodiment in which different elements of the described system are discrete components, such as the signal generator 105, the transducer 130 and the receiver 160, and the respective sub-components of each of these, one skilled in the art may group components including any or all of these in a single component or multiple components as may be appropriate for a given application. For example, the signal generator 105 may be part of the same physical system as transducer 130; receiver 160 may be a separate device from the receiver transducer 165 and receiver-processor 185, which in turn may each be part of a separate physical system from receiver memory 170.

Figure 3:
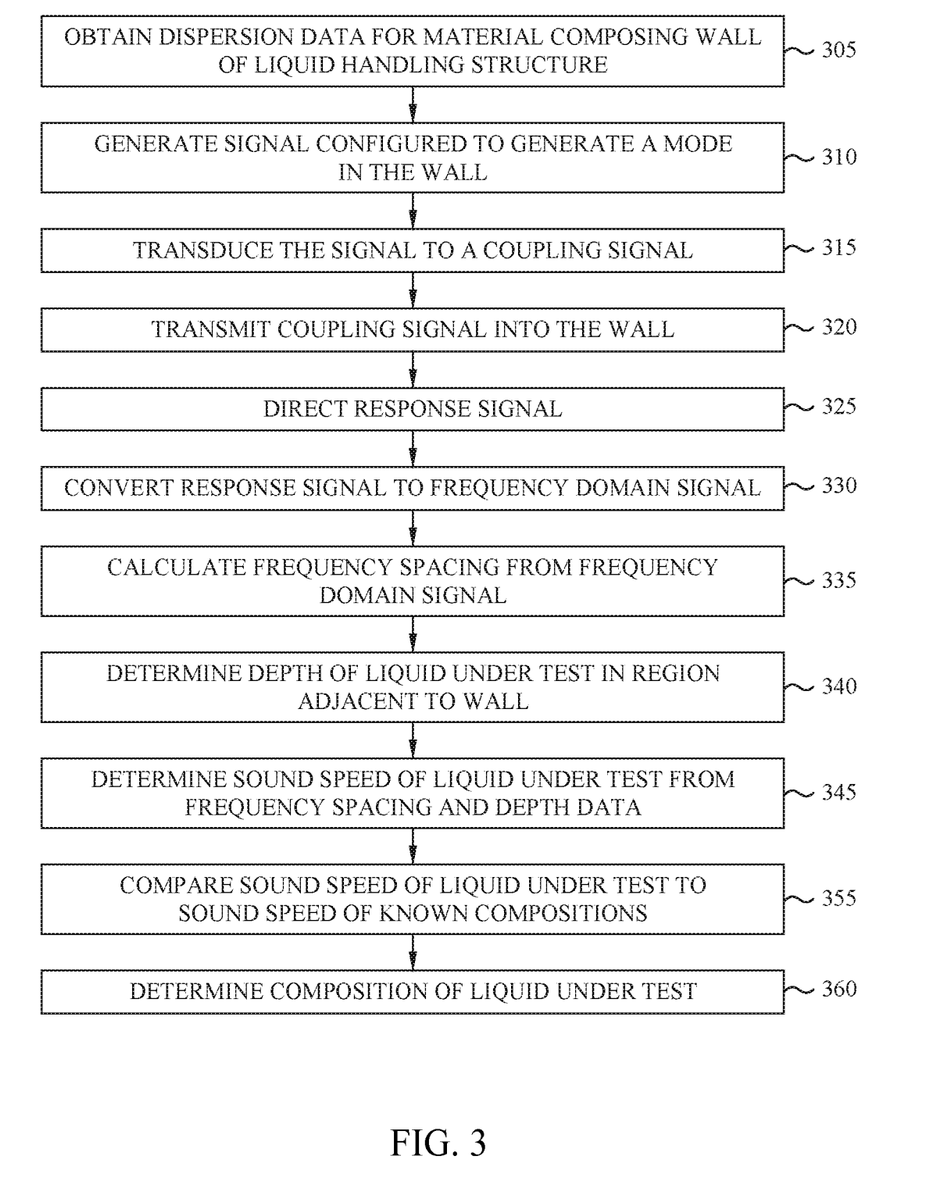
FIG. 3 depicts a method for determining the composition of a liquid in a liquid handling structure, according to embodiments.

FIG. 3 depicts a method 300 for determining the composition of a liquid in a liquid handling structure, according to embodiments. Elements included herein from FIGS. 1 and 2 are called out using the same element numbers from those figures.

At 305, material dispersion data 120 is obtained for material comprising the wall 140 of the liquid handling structure. As discussed above in connection with FIGS. 1 and 2, material dispersion data 120 may be obtained from a variety of sources known to those skilled in the art, such as known sources of this data (e.g. graphs, handbooks, databases), empirical determination, calculation from known theories or formulas, or any other method now known or later developed to determine material dispersion data 120. In embodiments, the material dispersion data 120 comprises a wavenumber and a frequency or wavenumber and a group velocity, or a wavenumber and a phase velocity. As these quantities are simply related to other relevant physical quantities, like wavelength, it will be obvious to one skilled in the art that the material dispersion data 120 can be displayed in a multitude of forms.

At 310, using the material dispersion data 120 obtained at 305, the waveform 125 is generated by the signal generator 105 that is configured to actuate the mode 145 in the wall 140 of the liquid handling structure.

At 315, the waveform 125 generated at 310 is transduced to the coupling signal 135. The type of energy that may be chosen for the coupling signal 135 may include, and is not limited to, pressure, acoustic, thermoacoustic, electromagnetic, or any other energy type capable of coupling the waveform 125 generated at 310 into the wall 140 such that the mode 145 is generated in the wall 140.

Moving to 320, the coupling signal 135 transduced at 315 is transmitted to the wall 140. In embodiments, the angle of incidence 137 of the transmission of the transduced signal is chosen based upon material dispersion data 120 obtained at 305, to target a wavenumber and frequency band where the slope of the elastic guided mode from the material dispersion data is equal to zero. It should be noted that when thermoacoustic actuation is used, the pulse rate of the laser, and an optical filter may be used to accomplish the same.

At 325, after the coupling signal 135 is transmitted to the wall 140, the response signal 155 is detected in the wall 140 via receiver sensor 180. In various embodiments, receiver sensor 180 is chosen as appropriate to the desired application and may be, for example, an acoustic sensor, a laser vibrometer, a pressure sensor, an electromagnetic sensor, or other sensor capable of detecting the response signal 155 at the wall 140.

At 330, the response signal 155 is converted to a frequency domain signal by the receiver processor 185 of the receiver 160.

From the frequency domain signal generated at 330, at 335 the receiver-processor 185 calculates frequency spacing. In embodiments, the receiver-processor 185 determines peak frequencies. In some cases these may be negative peaks indicating missing frequencies from the frequency domain signal that have been absorbed by the liquid under test 150 adjacent to mode 145 in the wall 140.

At 335, the depth of the liquid under test 150 adjacent to the mode 145 in the wall 140 may be determined. In some embodiments, at least a portion of the liquid under test 150 adjacent to the mode 145 in the wall 140 is free, that is, does not touch at least a portion of the surface of the liquid handling structure. In other embodiments there is no free surface of the liquid under test 150 adjacent to mode 145, that is, the liquid under test 150 fills the portion of the liquid handling structure adjacent to the mode 145.

With the frequency spacing calculated at 335 and the depth of the liquid under test 150 calculated at 340, at 345 the receiver-processor 185 may calculate the sound speed of the liquid under test 150. In embodiments, the sound speed of the liquid under test 150 is calculated from the (positive or negative) spacing between the peak frequencies determined from the frequency domain signal from 335, described above.

At 350, the sound speed of the liquid under test 150 may be compared to known composition sound speed data 190. By making this comparison, at 360 the composition of the liquid under test 150 may be determined by the receiver-processor 185.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The following claims are not intended to be limited to the embodiment shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 USC § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system to determine a composition of a liquid in a liquid handling structure, comprising:
    a memory comprising:
        material dispersion data which includes a frequency associated with a material of the liquid handling structure, the material dispersion data used to generate a mode associated with a type of the material, and
        composition sound speed data of at least one known liquid composition;
    a signal generator configured to access the material dispersion data and to receive the frequency from the material dispersion data, thereby generating a waveform;
    a transducer configured to receive the waveform from the signal generator, convert the waveform to a coupling signal configured to generate the mode in a surface of the liquid handling structure, and transmit the coupling signal to the surface of the liquid handling structure;
    a receiver sensor to receive a response signal generated in response to transmitting of the coupling signal to the surface of the liquid handling structure;
    one or more processors configured to:
        convert the response signal to a frequency domain signal;
        determine frequencies that are missing from the frequency domain signal;
        determine a sound speed of the liquid in the liquid handling structure from the frequency domain signal, wherein determining the sound speed of the liquid in the structure comprises inferring the sound speed of the liquid in the structure from the frequencies that are missing from the frequency domain signal;
        compare the sound speed of the liquid in the liquid handling structure to the known composition sound speed data; and
    a display configured to indicate whether the liquid in the liquid handling structure is substantially the same as the at least one known liquid composition.

2. The system of claim 1, wherein the coupling signal is configured to generate a zero group velocity mode.

3. The system of claim 1, wherein the one or more processors are further configured to determine a frequency spacing of two or more dominant frequencies in the frequency domain signal, and wherein determining the sound speed of the liquid in the liquid handling structure is based upon the frequency spacing of the two or more dominant frequencies.

4. The system of claim 1, wherein the liquid handling structure comprises at least one of a pipe and a container.

5. The system of claim 1, wherein the material dispersion data comprises a wavenumber to generate a mode in the material.

6. The system of claim 5, wherein the transducer is configured to receive the wavenumber, the wavenumber substantially defining an angle of incidence at which the transducer transmits the coupling signal to the surface of the liquid handling structure.

7. The system of claim 6, wherein the coupling signal comprises one of an acoustic signal, a thermoacoustic signal, a pressure signal, and an electromagnetic signal.

8. A method to determine a composition of a liquid in a liquid handling structure, comprising:
    providing material dispersion data for a material of the liquid handling structure, the material dispersion data comprising a wavenumber and a frequency;
    transmitting a coupling signal comprising the wavenumber and the frequency, to actuate a mode in the material of the liquid handling structure;
    receiving a response signal from the liquid handling structure;
    converting the response signal to a frequency domain signal;
    determining a sound speed of the liquid from the frequency domain signal, wherein determining the sound speed further comprises determining at least two frequencies that are missing from the frequency domain signal and inferring the sound speed from the at least two frequencies that are missing;

comparing the sound speed of the liquid to a sound speed of a known liquid composition; and displaying whether the liquid in the liquid handling structure is substantially the same as a known liquid composition.

9. The method of claim 8, wherein the coupling signal is configured to generate a zero group velocity mode in the material of the liquid handling structure.

10. The method of claim 8, wherein the determining the sound speed further comprises determining a frequency spacing of two or more dominant frequencies of the frequency domain signal.

11. The method of claim 8, wherein the transmitting the coupling signal further comprises transmitting the coupling signal at an angle of incidence to a surface of the liquid handling structure based upon the wavenumber.

12. The method of claim 11, wherein the coupling signal comprises one of an acoustic signal, a thermoacoustic signal, a pressure signal, and an electrodynamic signal.

13. A system to determine a composition of a liquid in a liquid handling structure, comprising:

a transducer configured to couple a waveform to a location in a wall of a liquid handling structure, wherein the waveform is configured to actuate a standing wave mode in the liquid;

a receiver sensor positioned to receive a response signal generated by the standing wave mode in the liquid;

one or more processors configured to determine a sound speed of the liquid under test from the response signal, wherein the sound speed of the liquid is determined from frequencies missing from the response signal; and a display configured to display the sound speed of the liquid.

14. The system to determine a composition of a liquid in a liquid handling structure of claim 13, wherein the mode signal is a zero group velocity mode.

15. The system to determine a composition of a liquid in a liquid handling structure of claim 13, wherein the receiver sensor is outside of the liquid handling structure.

16. The system to determine a composition of a liquid in a liquid handling structure of claim 13, wherein the liquid comprises a free surface in a region adjacent to the location in the wall in which the mode signal is coupled.

17. The system to determine a composition of a liquid in a liquid handling structure of claim 13, further comprising one or more processors configured to compare the sound speed of the liquid to at least one known liquid sound speed, and wherein the display is configured to indicate whether or not the sound speed of the liquid is the same as the known liquid sound speed.

* * * * *